United States Patent Office 3,823,240
Patented July 9, 1974

---

3,823,240
FUNGICIDAL HYDANTOIN DERIVATIVES
Michel Sauli, Paris, France, assignor to Rhone-Poulenc S.A., Paris, France
No Drawing. Original application Oct. 5, 1971, Ser. No. 186,772, now Patent No. 3,755,350. Divided and this application Jan. 18, 1973, Ser. No. 324,788
Claims priority, application France, Oct. 6, 1970, 7036084; Aug. 6, 1971, 7128896
Int. Cl. A01n 9/22
U.S. Cl. 424—273
9 Claims

ABSTRACT OF THE DISCLOSURE

The hydantoin derivatives of the formula:

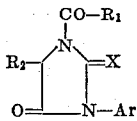

wherein Ar represents phenyl, or phenyl carrying substituents selected from halogen, alkyl, alkoxy and trifluoromethyl, $R_1$ represents alkoxy or a grouping $-NR_3R_4$, in which $R_3$ and $R_4$ represent hydrogen, alkyl or alkenyl, $R_2$ represents hydrogen or alkyl, and X represents oxygen or sulphur, possess fungicidal properties.

---

This is a division of application Ser. No. 186,772, filed Oct. 5, 1971, now Pat. No. 3,755,350.

This invention relates to new hydantoin derivatives which possess fungicidal properties to processes for their preparation and to compositions containing them.

The hydantoin derivatives of the present invention are compounds of the general formula:

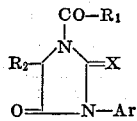   I wherein Ar represents a phenyl radical or a phenyl radical carrying one to five substituents, which may be the same or different, selected from halogen atoms (preferably chlorine), alkyl and alkoxy radicals containing 1 to 4 carbon atoms and the trifluoromethyl radical, $R_1$ represents an alkoxy radical containing 1 to 4 carbon atoms or a grouping $-NR_3R_4$, in which $R_3$ and $R_4$ are the same or different and each represents a hydrogen atom, an alkyl radical containing 1 to 4 carbon atoms or an alkenyl radical containing 2 to 4 carbon atoms, $R_2$ represents a hydrogen atom or an alkyl radical containing 1 to 4 carbon atoms, and X represents an oxygen or sulphur atom.

According to a feature of the invention, the hydantoin derivatives of general formula I are prepared by the process which comprises reacting a compound of the general formula:

$$Hal-CO-R_1 \quad \quad II$$

(wherein Hal represents a halogen, preferably chlorine, atom and $R_1$ is as hereinbefore defined) with a hydantoin compound of the general formula:

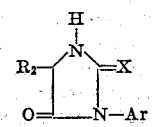   III wherein Ar, $R_2$ and X are as hereinbefore defined. Generally the reaction can be carried out in a basic organic solvent such as pyridine or in an organic solvent such as benzene, chloroform, acetonitrile, dimethylformamide or N-methyl-pyrrolidone, in the presence of a strong base such as an alkali metal alkoxide, for example potassium ethoxide, at a temperature between 0° C. and the boiling temperature of the reaction mixture.

The starting materials of general formula III can be obtained by cyclisation of an acid or ester of the general formula:

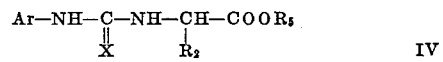   IV wherein $R_5$ represents a hydrogen atom or an alkyl radical containing 1 to 4 carbon atoms, and Ar, $R_2$ and X are as hereinbefore defined. The cyclisation can generally be effected by heating in an organic solvent in the presence of a basic condensation agent.

The compounds of general formula IV can be obtained either:

(a) by the action of an acid or ester of the general formula:

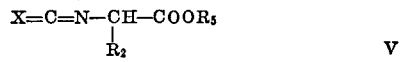

   V (wherein $R_2$, X and $R_5$ are as hereinbefore defined) on an aniline of the general formula:

$$Ar-NH_2 \quad \quad VI$$

(wherein Ar is as hereinbefore defined), or (b) by the action of an amino-acid or ester of the general formula:

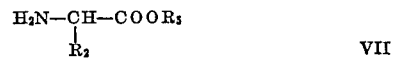

   VII (wherein $R_2$ and $R_5$ are as hereinbefore defined) on a phenyl isocyanate or isothiocyanate of the general formula:

$$Ar-N=C=X \quad \quad VIII$$

(wherein Ar and X are as hereinbefore defined) according to known methods for the preparation of ureas and thioureas.

According to another feature of the invention the hydantoin derivatives of general formula I, wherein $R_1$ represents a grouping $-NR_3R_4$ in which $R_3$ represents a hydrogen atom and $R_4$ represents an alkyl radical containing 1 to 4 carbon atoms or an alkenyl radical containing 2 to 4 carbon atoms, are prepared by the process which comprises reacting an isocyanate of the general formula:

$$R_{4'}-N=C=O \quad \quad IX$$

(wherein $R_{4'}$ represents an alkyl radical containing 1 to 4 carbon atoms or an alkenyl radical containing 2 to 4 carbon atoms) with a hydantoin compound of general formula III by known methods for the preparation of ureas, for example by heating the reactants in an organic solvent such as benzene or acetone in the presence of a basic condensation agent such as triethylamine. By the term "known methods" is meant methods heretofore used or described in the literature.

The hydantoin derivatives of general formula I obtained by the aforementioned processes may optionally be purified by physical methods such as crystallisation, distillation or chromatography.

The hydantoin derivatives of general formula I possess valuable fungicidal properties; they are particularly active against grey moulds (*Botrytis cinerea*) bean anthracnose (*Colletotrichum lindemuthianum*) and sclerotinia rot (*Sclerotinia sclerotiorum*) when used in quantities between 25 and 100 g. per hectolitre of, for example, water. They are particularly intersting for the treatment of vines, strawberry plants, fruit trees (e.g. peach, apricot and cherry trees) and market gardening produce (e.g. vegetables for salids) to control fungal infections. Preferred compounds are those in which Ar represents the phenyl radical or a phenyl radical carrying one or two substituents selected from chlorine and fluorine atoms, alkyl radicals containing 1 to 4 carbon atoms (preferably methyl) and the trifluoromethyl radical, and more particularly those compounds wherein Ar represents the 3,5-dichlorophenyl radical, $R_1$ represents a grouping —$NR_3R_4$ in which $R_3$ represents a hydrogen atom and $R_4$ represents an alkyl radical containing 1 to 4 carbon atoms or an alkenyl radical containing 2 to 4 carbon atoms (preferably allyl), and $R_2$ and X are as hereinbefore defined. Of outstanding importance are 1-propylcarbamoyl-3-(3,5-dichlorophenyl)hydantoin,
1-allylcarbamoyl-3-(3,5-dichlorophenyl)hydantoin,
1-isopropylcarbamoyl-3-(3,5-dichlorophenyl)hydantoin,
1-methylcarbamoyl-3-(3,5-dichlorophenyl)hydantoin,
1-ethylcarbamoyl-3-(3,5-dichlorophenyl)hydantoin,
1-methylcarbamoyl-3-(3,5-dichlorophenyl)-2-thiohydantoin and
1-ethylcarbamoyl-3-(3,5-dichlorophenyl)-2-thiohydantoin.

The present invention also includes within its scope fungicidal compositions which comprise, as the active ingredient, at least one hydantoin derivative of general formula I in association with one or more diluents or adjuvants compatible with the hydantoin derivative(s) and suitable for use in agricultural fungicidal compositions. These compositions can optionally contain other compatible pesticides, such as insecticides or fungicides (e.g. maneb). Preferably the compositions contain between 0.005% and 80% by weight of hydantoin derivative.

The compositions may be solid if there is employed a powdered solid compatible diluent such as talc, calcined magnesia, kieselguhr, tricalcium phosphate, powdered cork, adsorbent charcoal, or a clay such as kaolin or bentonite. These solid compositions are preferably prepared by grinding the hydantoin derivative with the solid diluent, or by impregnating the solid diluent with a solution of the hydantoin derivative in a volatile solvent, evaporating the solvent, and if necessary grinding the product so as to obtain a powder.

Instead of a solid diluent, there may be used a liquid in which the hydantoin derivative is dissolved or dispersed. The compositions may thus take the form of suspensions, emulsions or solutions in organic or aqueous-organic media, for example aromatic hydrocarbons such as toluene or xylene, mineral, animal or vegetable oils, anisole, cyclohexanone or acetophenone, or mixtures of these diluents. The compositions in the form of suspensions, emulsions or solutions may contain wetting, dispersing or emulsifying agents of the ionic or nonionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxy groups by condensation with ethylene oxide. It is preferable to use agents of the non-ionic type because they are not sensitive to electrolytes. When emulsions are required, the hydantoin derivatives may be used in the form of self-emulsifying concentrates containing the active substance dissolved in the emulsifying agent(s) or in a solvent containing the emulsifying agent(s) compatible with the hydantoin derivative and solvent, a simple addition of water to such concentrates producing compositions ready for use.

The hydantoin derivatives of general formula I are preferably employed as fungicides in quantities of 20 to 200 g. per hectolitre of water, and in the field at the rate of about 1,000 litres of solution per hectare under cultivation.

The following Examples illustrate the invention.

EXAMPLE 1

A 22.5% (w./v.) ethanolic solution of potassium ethoxide (32 cc.) is added to a suspension of 3-phenylhydantoin (12.3 g.) in benzene (150 cc.). After azeotropic distillation of the ethanol, methyl chloroformate (6.6 g.) is added and the reaction mixture heated for 10 minutes under reflux. The benzene is then evaporated under reduced pressure and the residue is recrystallised from ethanol to yield 1-methoxycarbonyl-3-phenylhydantoin (11 g.) melting at 154° C.

3-Phenylhydantoin, m.p. 156° C., employed as starting material can be prepared according to the method described by Dains, J. Amer. Chem. Soc., 44, 2312 (1922).

By proceeding as described above but starting with appropriate compounds of general formulae II and III there are obtained the following products:

| Ex. No. | Product | Melting point (° C.) |
|---|---|---|
| 2 | 1-methoxycarbonyl-3-(3-chlorophenyl)hydantoin | 140 |
| 3 | 1-ethoxycarbonyl-3-(3-chlorophenyl)hydantoin | 128 |
| 4 | 1-methoxycarbonyl-3-(3,5-dichlorophenyl)hydantoin | 200 |
| 5 | 1-ethoxycarbonyl-3-(3,5-dichlorophenyl)hydantoin | 156 |
| 6 | 1-ethoxycarbonyl-3-(3-fluorophenyl)hydantoin | 126 |
| 7 | 1-ethoxycarbonyl-3-(2,4-dichlorophenyl)-5-methylhydantoin | 100 |
| 8 | 1-methoxycarbonyl-3-(2,4-dichlorophenyl)-5-methylhydantoin | 105 |
| 9 | 1-methoxycarbonyl-3-(2,4-dichlorophenyl)hydantoin | 162 |
| 10 | 1-methoxycarbonyl-3-(3,5-dimethylphenyl)hydantoin | 136 |

EXAMPLE 11

A 22.5% (w./v.) ethanolic solution of potassium ethoxide (26 cc.) is added to a suspension of 3-(3-chlorophenyl)hydantoin (14 g.) in benzene (200 cc.). After azeotropic distillation of the ethanol, dimethylcarbamoyl chloride (7.2 g.) is added and the reaction mixture is heated for 10 minutes under reflux. The precipitate which forms is filtered off and the benzene is evaporated under reduced pressure. The residue obtained is washed successively with anaesthetic grade diethyl ether (50 cc.) and petroleum ether (b.p. 50–70° C.; 50 cc.) to yield 1-dimethylcarbamoyl-3-(3-chlorophenyl)hydantoin (7.8 g.) melting at 152° C.

3-(3-Chlorophenyl)hydantoin, m.p. 143° C., employed as starting material can be prepared according to the method described by Dains, J. Amer. Chem. Soc., 44, 2312 (1922).

EXAMPLE 12

Allyl isocyanate (4.5 g.) and triethylamine (5.5 g.) are added to a solution of 3-(3,5-dichlorophenyl)-hydantoin (11 g.) in acetone (150 cc.). After 30 minutes heating under reflux followed by cooling, the acetone is evaporated under reduced pressure. The residue obtained is washed with petroleum ether (b.p. 50–70° C.; 250 cc.) and recrystallised from ethanol to yield 1-allylcarbamoyl-3-(3,5-dichlorophenyl)hydantoin (11 g.) melting at 116° C.

3-(3,5-Dichlorophenyl)hydantoin, m.p. 199° C., employed as starting material can be prepared according to the method described by Dhar, J. Soc. Ind. Research, 20c, 145 (1961).

EXAMPLE 13

Propyl isocyanate (4.6 g.) and triethylamine (5.5 g.) are added to a solution of 3-(3,5-dichlorophenyl)-hydantoin (11 g.) in acetone (150 cc.) After 30 minutes heating under reflux following by cooling, the acetone is evaporated under reduced pressure. The residue obtained is washed with petroleum ether (b.p. 50–70° C.; 250 cc.) and recrystallised from diisopropyl ether to yield 1-propylcarbamoyl-3-(3,5-dichlorophenyl)hydantoin (11 g.) melting at 92° C.

By proceeding as described above but starting with appropriate compounds of general formulae III and IX there are obtained the following products:

| Ex. No. | Product | Melting point (° C.) |
|---|---|---|
| 14 | 1-isopropylcarbamoyl-3-(3-chlorophenyl)hydantoin | 109 |
| 15 | 1-propylcarbamoyl-3-(3-chlorophenyl)hydantoin | 90 |
| 16 | 1-methylcarbamoyl-3-(3,5-dichlorophenyl)hydantoin | 163 |
| 17 | 1-ethylcarbamoyl-3-(3,5-dichlorophenyl)hydantoin | 152 |
| 18 | 1-methylcarbamoyl-3-(3-chlorophenyl)-5-methylhydantoin | 130 |
| 19 | 1-isopropylcarbamoyl-3-(3,5-dichlorophenyl)hydantoin | 136 |
| 20 | 1-butylcarbamoyl-3-(3,5-dichlorophenyl)hydantoin | 112 |
| 21 | 1-isopropylcarbamoyl-3-(3,5-dichlorophenyl)-5-methylhydantoin | 125 |
| 22 | 1-ethylcarbamoyl-3-(3-fluorophenyl)hydantoin | 140 |
| 23 | 1-propylcarbamoyl-3-(3-fluorophenyl)hydantoin | 93 |
| 24 | 1-methylcarbamoyl-3-(3-trifluoromethylphenyl)hydantoin | 120 |
| 25 | 1-methylcarbamoyl-3-(3-fluorophenyl)hydantoin | 207 |

EXAMPLE 26

Methyl isocyanate (3.4 g.) and triethylamine (4 g.) are added to a suspension of 3-(3,5-dichlorophenyl)-5-methylhydantoin (10.4 g.) in benzene (150 cc.). After heating for 1 hour under reflux followed by cooling, the benzene is evaporated under reduced pressure. The residue obtained is washed with anaesthetic grade diethyl ether (30 cc.) and petroleum ether (b.p. 50–70° C.; 200 cc.) and recrystallised from ethanol to yield 1-methylcarbamoyl - 3 - (3,5-dichlorophenyl)-5-methylhydantoin (9 g.) melting at 137° C.

3 - (3,5 - Dichlorophenyl) - 5-methylhydantein, m.p. 156° C., employed as starting material can be prepared according to the method described by Dhar, J. Soc. Ind. Research, 20c, 145 (1961).

By proceeding as described above but starting with appropriate compounds of general formulae III and IX there are obtained the following products:

| Ex. No. | Product | Metinlg point (° C.) |
|---|---|---|
| 27 | 1-butylcarbamoyl-3-(3,5-dichlorophenyl)-5-methylhydantoin | 95 |
| 28 | 1-t-butylcarbamoyl-3-(3,5-dichlorophenyl)hydantoin | 181 |

EXAMPLE 29

Methyl isocyanate (3.4 g.) and triethylamine (5 g.) are added to a solution of 3-(3,5-dimethylphenyl)-hydantoin (10.2 g.) in acetone (120 cc.). After leaving the reaction mixture to stand for 24 hours at a temperature of about 20° C., the precipitate which forms is filtered off and dried in vacuo over sulphuric acid. There is thus obtained 1 - methylcarbamoyl - 3-(3,5-dimethylphenyl)hydantoin (11 g.) melting at 204° C.

3 - (3,5 - Dimethylphenyl)hydantoin, m.p. 128° C., employed as starting material can be prepared according to the method described by Dhar, J. Soc. Ind. Research, 20c, 145 (1961).)

EXAMPLE 30

A 22.5% (w./v.) ethanolic solution of potassium ethoxide (13 cc.) is added to solution of 3-phenyl-2-thiohydantoin (6.8 g.) in N-methylpyrrolid-2-one (150 cc.). After distillation of the ethanol under reduced pressure, ethyl chloroformate (3.8 g.) is added and the reaction mixture stirred for 5 hours at about 25° C. A small amount of insoluble material is separated by filtration and the filtrate poured into ice-water (500 cc.). The precipitate which forms is filtered off and recrystallised from ethanol to yield 1 - othoxycarbonyl - 3 - phenyl-2-thiohydantoin (4.2 g.) melting at 142° C.

3-Phenyl-2-thiohydantoin, m.p. 242° C., employed as starting material can be prepared according to the method described by Aschan, Ber., 17, 424 ((1884).

By proceeding as described above but starting with appropriate compounds of general formulae II and III there are obtained the following products:

| Ex. No. | Product | Melting point (° C.) |
|---|---|---|
| 31 | 1-methoxycarbonyl-3-phenyl-2-thiohydantoin | 180 |
| 32 | 1-methoxycarbonyl-3-(3,5-dichlorophenyl)-2-thiohydantoin | 174 |

EXAMPLE 33

Methyl isocyanate (3.2 g.) and triethylamine (0.5 cc.) are added to a suspension of 3-(3-chlorophenyl)-2-thiohydantoin (7 g.) in benzene (100 cc.). After heating for 2 hours under reflux followed by cooling, the precipitate which forms is filtered off, washed with diisopropyl ether (2× 50 cc.) and dried in vacuo over sulphuric acid. There is thus obtained 1 - methylcarbamoyl - 3 - (3 - chlorophenyl)-2-thiohydantoin (6.7 g.) melting a 170° C.

3-(3-Chlorophenyl) - 2 - thiohydantoin, m.p. 216° C., employed as starting material can be prepared according to the method described by Dains, J. Amer. Chem. Soc., 44, 2312 (1922).

By proceeding as described above but starting with appropriate compounds of general formulae III and IX there are obtained the following products:

| Ex. No. | Product | Melting point (° C.) |
|---|---|---|
| 34 | 1-methylcarbamoyl-3-(3,5-dichlorophenyl)-2-thiohydantoin | 210 |
| 35 | 1-ethylcarbamoyl-3-(3,5-dichlorophenyl)-2-thiohydantoin | 216 |

EXAMPLE 36

A 22.5% (w./v.) ethanolic solution of potassium ethoxide (15.4 cc.) is added to a solution of 3-(3,5-dichlorophenyl) - 2 - thiohydantoin (10.4 g.) in dimethylformamide (150 cc.). After removal of the ethanol by distillation, dimethylcarbamoyl chloride (4.3 g.) is added. After leaving the reaction mixture overnight at a temperature of about 20° C., the reaction mixture is poured into water (1,500 cc.) and the precpitate which forms is extracted with methylene chloride (1,000 cc.). After chromatography through a column of "Florisil" (an activated magnesium silicate) and recrystallisation from toluene, there is obtained 1 - dimethylcarbamoyl - 3 - (3,5 - dichlorophenyl)-2-thiohydantoin (1.6 g.) melting at 216° C.

3-(3,5 - Dichlorophenyl) - 2 - thiohydantoin, m.p. 258° C., employed as starting material can be prepared according to the method described by Dains, J. Amer. Chem. Soc., 44, 2313 (1922).

EXAMPLE 37

In accordance with a usual technique there is prepared an emulsifiable solution having the following composition:

G.

1-propylcarbamoyl - 3 - (3,5-dichlorophenyl)hydantoin _____ 400
Tween 20 _____ 10
Altox 4855 _____ 90
Cyclohexanone-xylene mixture (1–3 by volume) quantity to make up to 1,000 cc.

EXAMPLE 38

In accordance with a usual technique there is prepared an emulsifiable solution having the following composition:

G.

1-propylcarbamoyl - 3 - (3,5-dichlorophenyl)hydantoin _____ 400
Tween 20 _____ 10
Altox 4855 _____ 90
Anisole, quantity to make up to 1,000 cc.

"Tween 20" is a wetting agent which is a condensate of ethylene oxide with fatty acid esters of sorbitol, and "Atlox 4855" is an emulsifying agent which is a polyoxyethylene derivative of an arylsulphonate.

I claim:

1. A fungicidal composition comprising as the active ingredient a hydantoin derivative of the formula:

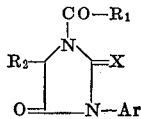

wherein Ar represents phenyl or phenyl substituted with one to two substituents selected from the group consisting of chlorine, fluorine, alkyl of 1 to 4 carbon atoms and trifluoromethyl; $R_1$ represents alkoxy of 1 to 4 carbon atoms or —$NR_3R_4$, in which $R_3$ and $R_4$ represents hydrogen, alkyl of 1 to 4 carbon atoms or alkenyl of 2 to 4 carbon atoms; $R_2$ represents hydrogen or alkyl of 1 to 4 carbon atoms; and X represents oxygen or sulphur in association with one or more diluents compatible with said hydantoin derivative and suitable for use in agricultural fungicidal compositions, the amount of hydantoin derivative in the composition being between 0.005% and 80% by weight of the composition.

2. The composition of claim 1 in which, in the said hyantoin derivative, Ar represents 3,5-dichlorophenyl and $R_1$ represents —$NHR_4$ in which $R_4$ represents alkyl of 1–4 carbon atoms or alkenyl of 2–4 carbon atoms.

3. The composition of claim 1, wherein said hydantoin derivative is 1 - propylcarbamoyl - 3 - (3,5 - dichlorophenyl)hydantoin.

4. The composition of claim 1, wherein said hydantoin derivative is 1 - allylcarbamoyl - 3 - (3,5 - dichlorophenyl)hydantoin.

5. The composition of claim 1, wherein said hydantoin derivative is 1 - isopropylcarbamoyl - 3 - (3,5 - dichlorophenyl)hydantoin.

6. The composition of claim 1, wherein said hydantoin derivative is 1 - methylcarbamoyl - 3 - (3,5 - dichlorophenyl)hydantoin.

7. The composition of claim 1, wherein said hydantoin derivative is 1 - ethylcarbamoyl - 3 - (3,5 - dichlorophenyl)hydantoin.

8. The composition of claim 1, wherein said hydantoin derivative is 1 - methylcarbamoyl - 3 - (3,5 - dichlorophenyl)-2-thiohydantoin.

9. The composition of claim 1, wherein said hydantoin derivative is 1 - ethylcarbamoyl - 3 - (3,5 - dichlorophenyl)-2-thiohydantoin.

References Cited

UNITED STATES PATENTS 3,300,510  1/1967  Alburn et al. _____ 260—309.5
3,681,377  8/1972  Singhal _____ 260—309.5

ALBERT T. MEYERS, Primary Examiner
L. SCHENKMAN, Assistant Examiner